Figure 1:
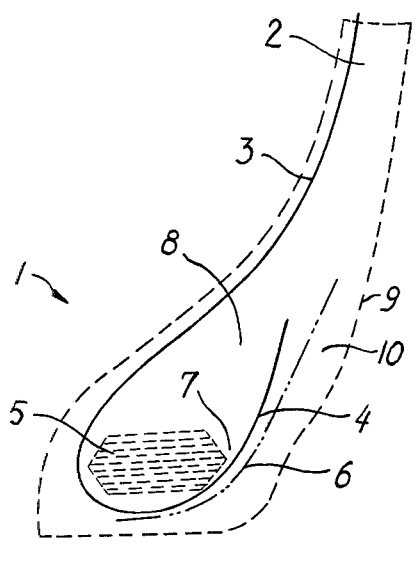

United States Patent [19]
Boileau

[11] 3,938,575
[45] Feb. 17, 1976

[54] PNEUMATIC TIRES

[75] Inventor: Jacques Boileau, Clermont-Ferrand, France

[73] Assignee: Compagnie Generale des Etablissements Michelin, raison sociale Michelin & Cie, France

[22] Filed: Apr. 9, 1975

[21] Appl. No.: 566,280

[30] Foreign Application Priority Data
Apr. 11, 1974  France .............................. 74.12898

[52] U.S. Cl. ............................ 152/362 R; 152/354
[51] Int. Cl.² ..................... B60C 15/00; B60C 9/02
[58] Field of Search ......... 152/362 R, 354, 356, 357

[56] References Cited
UNITED STATES PATENTS

| | | | |
|---|---|---|---|
| 3,253,639 | 5/1966 | Travers ........................... | 152/362 R |
| 3,297,073 | 1/1967 | Black et al. ...................... | 152/362 R |
| 3,406,733 | 10/1968 | Boileau ............................ | 152/362 R |
| 3,861,442 | 1/1975 | Bertrand .......................... | 152/362 R |

FOREIGN PATENTS OR APPLICATIONS

| | | | |
|---|---|---|---|
| 2,082,484 | 10/1971 | France ............................ | 152/362 R |
| 2,165,810 | 10/1973 | France ............................ | 152/362 R |

Primary Examiner—Drayton E. Hoffman
Attorney, Agent, or Firm—Brumbaugh, Graves, Donohue & Raymond

[57] ABSTRACT

The durability and stability of the beads of a radial ply pneumatic tire are improved by making the tensions acting on the main radial carcass ply and on the portion thereof folded over the bead ring different from each other and having the tension acting on the main radial carcass ply greater than the tension acting on the folded-over portion.

5 Claims, 4 Drawing Figures

U.S. Patent  Feb 17, 1976  3,938,575

PNEUMATIC TIRES

The present invention relates to improvements in pneumatic tires. More particularly, it concerns improvements in pneumatic tires of the type with radial carcass reinforcement combined with a crown reinforcement comprising at least two crossed plies.

The rings used in the beads of such tires generally, due to their substantial mass of materials of high mechanical properties, make an important contribution to the stability of the beads. Arranging these materials in suitable manner is sufficient to impart to the rings a certain torsion rigidity without thereby decreasing their resistance to tension. Thus, so-called bundle-rings are used as bead rings. They are made by winding a continuous filiform element on a special form. In this manner, one can obtain bead rings having meridian cross sections which are elongated in the axial direction of the tire or whose largest cross sectional dimension is inclined in the direction of the conicity of the beads. This type of bead ring has a better torsion rigidity than the so-called cabled bead rings. The latter have a relatively low torsion stability due to their approximately circular cross section and the helical arrangement of the filiform elements which serve to produce them. On the other hand, for the same cross section of material, the cabled bead rings have a rupture resistance which is definitely greater than that of the bundle-rings, since the stresses are better distributed over all of the elements. This is the reason why the applicant's French Pat. No. 2,082,484 achieves a favorable compromise between the two fundamental types of bead rings mentioned above by proposing a so-called triangulated bead ring. The composition of this ring includes at least two cabled rings so as to form, together with a third ring, an assembly which is very torsion rigid. However, this assembly is relatively space consuming and also results in the construction of massive, large beads.

With respect to the carcass reinforcement with its main plies and their folded-over portions, it in general provides only a rather modest contribution to the torsion rigidity of the beads. This is particularly true in the rather customary case in which the carcass reinforcement comprises only a single ply of metal cables or a small number of plies of metal or textile elastic cables. Recourse is then had to the addition of auxiliary plies in the beads. However, such a structure is space consuming, expensive to manufacture and subject to damage in travel by virtue of its very complexity. Furthermore, when the tires of the above type are used in the form of so-called tubeless tires, the beads not only serve as static joints between the tire and the rim but also have the mission, in operation, to remain in contact with the rim whatever the extent of bending of the side walls which are particularly flexible in radial tires. In this case, the beads are particularly stressed in operation.

The known bead structures are both large and stiff in order to assure their longevity and stability.

Taking into account the drawbacks enumerated above, the object of the present invention is to provide a bead structure for radial carcass tires which practically disregards the torsional rigidity of the bead rings and is directed essentially at cooperation of the main ply or plies of the carcass together with their portion folded around the bead ring or rings.

The invention is based on the fact — revealed by the research work of the applicant — that in order to obtain enduring and stable beads it is necessary first of all to make the tensions acting, on the one hand, on the main ply or plies and, on the other hand, on their folded-over part different from each other. Then it is necessary that the tension which acts on the main ply or plies be greater than that acting on their folded-over part. These two conditions must be satisfied when the tire, mounted on a rim, is inflated to its normal pressure, but is not under load.

For this purpose, the pneumatic tire in accordance with the invention, having a crown reinforcement formed of at least two crossed oblique plies of cables and a carcass reinforcement comprising at least one ply of radial cables the portion of which folded around the bead ring terminates in a part which is parallel to the carcass reinforcement, is characterized by the fact that:

a. the equilibrium curve of the carcass reinforcement passes between the center of gravity of the radial cross section of the bead ring and the point of contact of the carcass ply with the radial cross section of the bead ring, and b. the end of the radius from which the folded-over portion assumes an arrangement parallel to the carcass reinforcement is located at a distance from the center of gravity of the radial cross section of the bead ring of between 1/5 and ⅓ of the height of the pneumatic tire on its rim.

By equilibrium curve of the carcass reinforcement there is meant the path, as seen in meridian section, taken by the carcass reinforcement of the inflated carcass at the pressure of normal use of the tire, but not under load. This equilibrium curve is obtained on basis of the usual relations and complying with the customary conditions. These conditions are the radius at the crown of the tire and the maximum axial width of the carcass, as well as the width and diameter of the rim on which the tire is to be mounted.

In accordance with the invention, the carcass reinforcement deviates from the equilibrium curve, in the direction towards the bead ring, from the point defined by feature (b) above, where the reinforcement and its folded-over portion cease being parallel to each other. Geometrically this point is defined by the intersection of the equilibrium curve with a line parallel to the axis of rotation of the tire drawn at a distance equal to the sum of the radius of the rim and of a length which in accordance with the invention is between ⅓ and 1/5 of the height of the tire on its rim, this radius and this height being those contemplated by the standards.

The carcass reinforcement, as well as its folded-over portion, deviate, in accordance with the invention, from the neutral fiber, thus forming a rigid triangulated assembly the small side of which is represented physically by the bead ring and the other two sides by the carcass reinforcement and the folded-over portion thereof.

Depending on whether the terminal part of the foldedover portion, parallel to the carcass reinforcement, is arranged at an axial distance greater than or less than said reinforcement, there is obtained a side wall of less or greater flexibility and the difference in stiffness between the bead structure in accordance with the invention and the adjacent portion of the side walls will be greater or smaller. Therefore, when the said terminal part of the folded-over portion is brought against the carcass reinforcement, the side walls of the tire reach optimum flexibility.

The nondeformable nature of the node, radially outside the bead ring, of the triangulated bead structure in accordance with the invention goes also hand in hand with the decrease in the axial distance between the carcass reinforcement and the terminal part of the folded-over portion of the latter and reaches an optimum when said terminal part is brought against the carcass reinforcement. It is indispensable also that the said terminal part of the folded-over portion be immobilized in suitable manner with reference to the carcass reinforcement so that, in accordance with the basic principle of the invention, the tension acting on the carcass reinforcement is greater than that acting on the folded-over portion. For this reason it should be seen to that the terminal part of the folded-over portion parallel to the carcass reinforcement extend over a certain radial height.

In order to remove the end of this terminal part from the deformations of great amplitude to which the side wall of the tire is subjected, it is preferable to extend the terminal part of the folded-over portion in such a manner that its end is placed between the carcass reinforcement and the corresponding edge of the crown reinforcement. Such a preferential arrangement gives remarkable results in the case of lightened reinforcements such as those described in French Pat. No. 2,165,810, particularly by using elastic cables or wires as reinforcement elements for the carcass. The folded-over portion of the carcass reinforcement extended to beneath the corresponding edge of the crown reinforcement can then be considered an element of the carcass reinforcement which participates completely in the resistance of the carcass while exercising in the bead the functions which are imparted to it as a result of the invention.

In accordance with the purpose in view, which is to be independent of the rigidifying action of the bead ring, the structure in accordance with the invention is particularly suitable for cooperation with a bead ring of the cabled type described above. The use of a cabled bead ring affords several advantages. As stated above, a cabled bead ring is more resistant to rupture, for an equivalent cross section of metal, and therefore has a smaller cross section than a bundle-ring. This results in a substantial decrease in the width of the base of the bead as well as a lightening of the bead ring, which has an effect on the weight of the beads and then on that of the tire. Despite the reduction in the width of the base, such a bead has remarkable stability and endurance.

Due to the practically circular cross section of the cabled bead rings, the designing of the rings in accordance with the invention is facilitated. The center of gravity of such a ring is a matter of fact located substantially at the center of its cross section. If furthermore:

— the diameter of such a bead ring is equal to $a$,
— the distance from the center of gravity of its cross section to the point where the folded-over portion becomes parallel to the carcass reinforcement is equal to $b$,
— the ratio between the tension acting on the carcass reinforcement and that acting on the folded-over portion is equal to $k$, $k$ in accordance with the invention being greater than $l$, then the distance $x$ from the center of gravity of the cross section of the bead ring to the point (located between this center of gravity and the point of contact of the carcass reinforcement with the bead ring) through which the equilibrium curve or neutral fiber of the carcass reinforcement must pass, may be calculated by the equation $$(1) \qquad x = \frac{a}{2} - \frac{ab}{(k^2-1)(a^2+b^2)} [\sqrt{b^2 + (k^2-1)(a^2+b^2)} - b]$$

This equation can be extrapolated to a bead ring of any cross section in the following manner. It is sufficient to replace the width $a$ by the length of the projection of the cross section of the bead ring on a straight line passing through the center of gravity of this cross section and perpendicular to the tangent to the equilibrium figure of the carcass reinforcement at the level of the bead ring, the distance $b$ being selected in the manner described above.

The bead structure in accordance with the invention may of course comprise narrow plies cooperating with the rubber which customarily forms the base and the axially outer portion of the bead in contact with the rim, in order to increase the life of this rubber.

The following description of embodiments of the invention is given with reference to the accompanying drawings and is intended to facilitate an understanding of the invention, these examples of course being in no way limitative.

Figure 2:
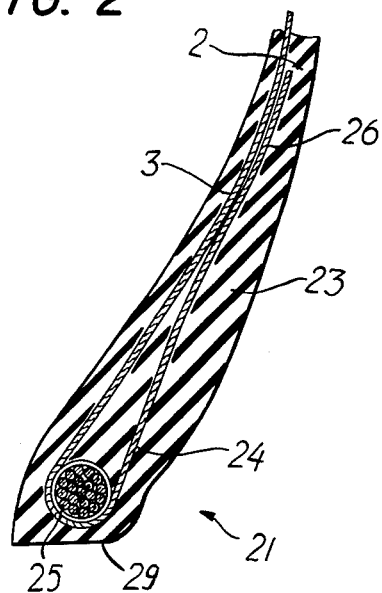
Figure 3:
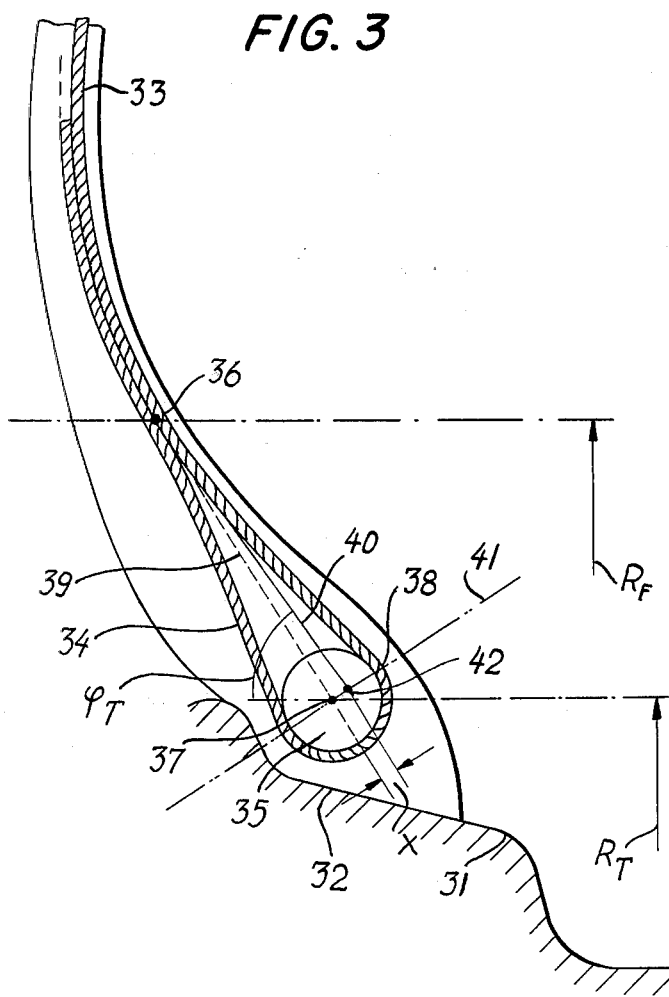
Figure 4:
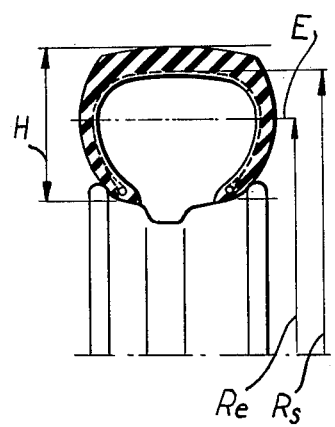

In the drawings:

FIG. 1 is a radial cross section through a bead of the type produced prior to the invention, FIG. 2 is a radial cross section on the same scale as FIG. 1 of a bead in accordance with the invention, FIGS. 3 and 4 illustrate the calculation and outline of the bead structure shown in FIG. 2, the bead occupying its customary place on a rim.

FIG. 1 shows a bead 1 and the adjacent portion 2 of the side wall of a tire (not shown). The carcass reinforcement 3 is formed of a single ply of radial cables with a folded-over portion 4 around the bead ring 5.

The bead ring 5 of the bundle type (details not shown) has a polygonal cross section which is elongated in the axial direction. It therefore has an appreciable torsion resistance. The folded-over portion 4 is relatively short and is reinforced by means of an auxiliary ply 6 of cables which are oblique with respect to the circumferential direction of the tire. In order to obtain a satisfactory life, the folded-over portion 4 is separated from the carcass ply 3 by a thick mass of rubber 8. The same is true of the stiffening ply 6 which, starting from the region 7 where the wrapping around the bead ring 5 terminates, moves away from the folded-over portion 4. The ply 6 is also isolated from the outer wall 9 of the bead by a large thickness of rubber 10.

Comparing FIG. 1 with FIG. 2 which illustrates, on the same scale as FIG. 1, a bead structure in accordance with the invention for a tire of the same dimension, a large decrease in the volume of the bead 21 of FIG. 2 and in particular of the width of the base 29 can be noted. As can be seen, the carcass ply 3 moves around the bead ring 25 and the folded over portion 24 becomes parallel to the ply 3 in a region 23 of the side wall 2 adjacent to the bead 21. The bead ring 25 is of the cabled type and therefore relatively subject to torsion. The terminal part 26 of the folded-over portion 24 is, in the example shown, not only parallel to but also against the carcass ply 3, that is to say the ply 3 is separated from the terminal part 26 of its folded-over portion 24 only by a thickness of rubber less than the diameter of the cables. As can be seen, the carcass ply 3, the bead ring 25 and the folded-over portion 24 form a triangular structure. The top of this structure, located at the level of the zone 23, is consolidated by the terminal part 26 of the folded-over portion 24 which is both parallel to the ply 3 and extended over a certain length in the side wall. The zone 23 thus constitutes the radially inner limit of the zone of flexure of the side wall. Due to the invention, this limit can be selected purposely without harming the life of the bead structure.

The cross section of the bead ring can also be reduced due to the arrangement in accordance with the invention, in view of a more uniform stressing of the wires constituting it. It is thus that in a tire for large tank trucks with an ordinary bead, such as that shown in FIG. 1, a maximum stress which is a multiple of the minimum stress is found from one axial end to the other of the cross section of the bead ring. On the other hand, in a tire of the same dimensions having a bead in accordance with the present invention, such as that shown in FIG. 2, it is found that the stresses in the bead ring are distributed practically symmetrically. Moreover, in a special case in which in the customary bead one employed a bead ring comprising 72 steel wires of 1.55 mm. diameter distributed over a cross section having an axial width of 23 mm. to obtain a satisfactory rupture resistance of the bead ring, it is sufficient in a tire with bead in accordance with the invention to employ a bead ring of 42 steel wires of 1.55 mm. diameter distributed in a polygonal cross section of only 12.3 mm. axial width. However, if the 72 wire ring of the known tire is retained in the tire in accordance with the invention, then its rupture resistance is increased by about 30% due to the fact that it is working under difficult conditions.

By adapting a bead structure in accordance with the invention to a radial carcass reinforcement in accordance with an equilibrium figure such as that defined by the well-known equation $$(2) \qquad \cos \phi = \frac{R^2 - R^2_e}{R^2_s - R^2_e}$$

one proceeds in the manner illustrated in FIG. 3 in the case of an extremely stressed bead of a tire intended to be mounted on a rim with inclined seat such as that contemplated by the standards.

There is first of all selected a rim of profile 31 taking into account the radius $R_s$ at the crown and the radius $R_e$ at the equator E of the tire which it is desired to produce. Thereupon the bead ring 35 with the carcass reinforcement 33 and its folded-over portion 34 are positioned with respect to the bead seat 32 on the rim. One then selects the lower limit 36 of the zone of flexure of the side walls in such a manner that the distance between the radius $R_T$ corresponding to the center of gravity 37 of the bead ring and the radius $R_F$ establishing said lower limit is included, in accordance with the invention, between ⅓ and 1/5 of the height H of the tire on the rim, as defined by the standards. One can then draw an equilibrium curve 39 for the carcass passing through the center of gravity 37 of the bead ring 35. In accordance with the invention, however, in order to obtain greater tension on the carcass reinforcement 33 than on the folded-over portion 34 it is necessary that the equilibrium curve 40 of the carcass pass between the point 37, which is the center of gravity of the bead ring 35, and the point of contact 38 of the carcass reinforcement 33 with the bead ring 35. In order to increase the tension on the carcass reinforcement 33, it is sufficient to increase the distance from the equilibrium curve 40 to the center of gravity 37. This distance is defined on a line 41 of slope ($\phi_T + 90°$) with respect to the axis of the tire and passing through the center of gravity 37 of the bead ring 35 by the length of the segment defined by the center 37 and the point of intersection 42 of the line 41 with the equilibrium curve 40. The angle $\phi_T$ itself is established by equation (2) above in which the radius R has been replaced by the radius $R_T$ of the center 37 of the bead ring 35. Moreover, the length x can easily be calculated by means of equation (1) as a function of the ratio k of the tension of the carcass reinforcement 33 and the tension of the folded-over portion 34. Thus, for instance, for a length a of the projection of the cross section of the bead ring 35 on the line 41 equal to 2 cm. and a distance b equal to 6 cm. between the center 37 and the lower limit point 36 of the zone of flexure, the length of the segment x must be equal to 0.8 cm. for a ratio k of 1.5, that is to say for a tension which is distributed 60% over the carcass reinforcement 33 and 40% over the folded-over portion 34.

The word "cable" used in the specification and the claims is to be understood as designating any type of filiform element formed by one or more wires.

What is claimed is:

1. In a pneumatic tire with a crown reinforcement formed of at least two crossed oblique plies of cables and a carcass reinforcement comprising at least one ply of radial cables the portion of which folded around the bead ring terminates in a part which is parallel to the carcass reinforcement, the improvement which comprises:
   a. the equilibrium curve of the carcass reinforcement passes between the center of gravity of the radial section of the bead ring and the point of contact of the carcass ply with the radial cross section of the bead ring, and
   b. the end of the radius from which the folded-over portion assumes an arrangement parallel to the carcass reinforcement is located at a distance from the center of gravity of the radial section of the bead ring of between 1/5 and ⅓ of the height of the pneumatic tire on its rim.

2. The pneumatic tire defined by claim 1 wherein the terminal part of the folded-over portion parallel to the carcass reinforcement is placed against said carcass reinforcement.

3. The pneumatic tire defined by claim 1 wherein the end of the terminal part of the folded-over portion parallel to the carcass reinforcement is arranged between the corresponding edge of the crown reinforcement and the carcass reinforcement and the carcass reinforcement together with its folded-over portions is composed of elastic cables.

4. The pneumatic tire defined by claim 1 wherein the bead rings are of the cabled type.

5. The pneumatic tire defined by claim 1 wherein distance x from the center of gravity of the cross section of the bead ring to the equilibrium curve of the carcass reinforcement is defined by the equation $$x = \frac{a}{2} - \frac{ab}{(k^2-1)(a^2+b^2)} [\sqrt{b^2 + (k^2-1)(a^2+b^2)} - b]$$

in which a is the length of the projection of the cross section of the bead ring on a straight line passing through the center of gravity of this cross section and perpendicular to the tangent to the equilibrium figure of the carcass reinforcement at the level of the bead ring, b is the distance from the center of gravity of the said cross section to the point where the folded-over portion becomes parallel to the carcass reinforcement, and k is the ratio, greater than 1, between the tension acting on the carcass reinforcement and the tension acting on the folded-over portion.

* * * * *